United States Patent [19]

Glorioso

[11] Patent Number: 5,030,815
[45] Date of Patent: Jul. 9, 1991

[54] APPARATUS FOR CONTROLLING A WELDING TOOL

[75] Inventor: Paul A. Glorioso, Amherst, Ohio

[73] Assignee: TRW Inc., Lyndhurst, Ohio

[21] Appl. No.: 619,243

[22] Filed: Nov. 28, 1990

[51] Int. Cl.$^5$ .............................................. B23K 9/20
[52] U.S. Cl. ................................................... 219/98
[58] Field of Search ................................. 219/98, 99

[56] References Cited

U.S. PATENT DOCUMENTS

| | | | |
|---|---|---|---|
| 3,136,880 | 3/1961 | Glorioso | 219/98 |
| 3,291,958 | 6/1964 | Glorioso | 219/98 |
| 3,392,257 | 12/1965 | Glorioso | 219/98 |
| 4,797,529 | 1/1989 | Schmitt et al. | 219/98 |

Primary Examiner—Clifford C. Shaw
Attorney, Agent, or Firm—Tarolli, Sundheim & Covell

[57] ABSTRACT

Apparatus is provided for welding a stud to a workpiece. The stud is positioned against the workpiece in such a manner that the stud retracts from an extended first position to a second position against the workpiece. The stud is then retracted away from the workpiece to a fully retracted third position. Welding current is provided so as to establish a welding arc between the stud and the workpiece as the stud is being retracted to the third position. The stud is then plunged toward the workpiece to make contact therewith. The displacement of the stud from its initial first position to the second position is measured during the time that the stud is in engagement with the workpiece and before the stud is retracted therefrom to the third position. The plunging of the stud toward the workpiece is controlled as a function of the measured displacement in such a manner as to control the point in time at which the stud makes contact with the workpiece.

15 Claims, 4 Drawing Sheets

APPARATUS FOR CONTROLLING A WELDING TOOL

BACKGROUND OF THE INVENTION

1. Technical Field

The present invention is directed to the art of welding a stud to a workpiece and, more particularly, to improvements in controlling the welding to compensate for variations in arc length as a result of workpiece variations or stud length variations.

2. Prior Art

Welding tools for welding studs, sometimes referred to herein as fasteners, to a metal workpiece are known in the art. Typically, a welding tool caries a stud, which is resiliently urged to an extended position. The stud is retracted slightly to a work position when the stud is pressed against a workpiece to place it in good electrical contact therewith. A trigger is then actuated to initiate a welding operation. The stud is then withdrawn from the workpiece toward a fully retracted position and a pilot arc is established. Thereafter, when the stud is in its fully retracted position, a main welding arc is established between the stud and the workpiece. Then the stud is plunged toward the workpiece and, upon making electrical contact therewith, the welding arc is extinguished. Welding tools that perform the above functions are described in my previous U.S. Pat. Nos. 3,291,958; 3,136,880 and 3,392,257.

It has been determined that the arcing time in stud welding will vary due to changes in arc length caused by variations in workpiece or stud length. Unless compensation is provided, there will be a tendency to have inconsistent weld quality from weld to weld. In my previous U.S. Pat. No. 3,392,257, provisions are made for sensing the position of a stud to be welded prior to the beginning of a weld cycle. If a stud is not in a proper position, the welding circuit is rendered inoperative until a proper stud position is attained. No provisions are made for controlling the plunging of the stud toward the workpiece as a function of measured displacement in order to control the point in time at which the stud makes contact with the workpiece.

SUMMARY OF THE INVENTION

The present invention is directed toward improvements for obtaining consistent weld quality from weld to weld. The displacement of the stud from its extended position to its work position in engagement with the workpiece is measured prior to fully retracting the stud. This measurement is used to control the plunging of the stud toward the workpiece as a function of the measured displacement to thereby control the point in time at which the stud makes contact with the workpiece.

In accordance with the present invention, apparatus is provided for welding a stud to a workpiece. The stud is positioned against a workpiece in such a manner that the stud is retracted from an initial first position to a second position against the workpiece. The stud is then retracted from the workpiece to a fully retracted third position. Welding current is provided to establish a welding arc between the stud and the workpiece as the stud is being retracted to the third position. The stud is plunged toward the workpiece to make contact therewith. The displacement of the stud from the first position to the second position is measured while the stud is in engagement with the workpiece and before the stud is retracted therefrom to the third position. The plunging of the stud is controlled as a function of the measured displacement to thereby control the point in time at which the stud makes contact with the workpiece.

BRIEF DESCRIPTION OF THE DRAWINGS

The foregoing and other features and advantages of the present invention will become more apparent to those skilled in the art, to which the present invention relates, from a reading of the following description of a preferred embodiment with reference to the accompanying drawings, in which.

DETAILED DESCRIPTION OF A PREFERRED EMBODIMENT

Figure 1:
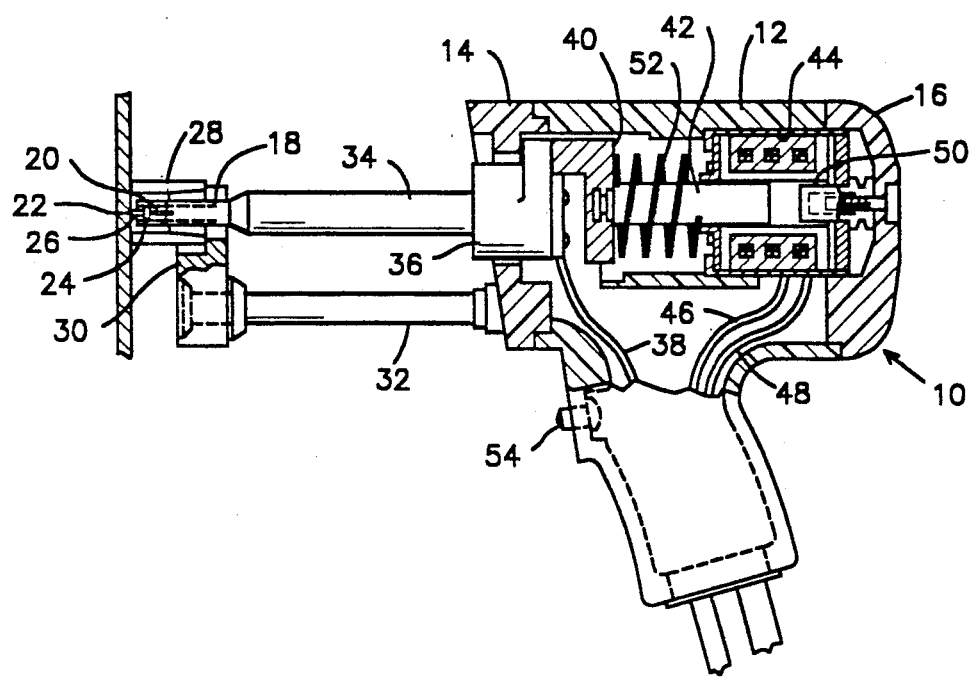
FIG. 1 is a view in longitudinal cross section of a typical welding tool to which the present invention may be applied.

Reference is now made to FIG. 1 which illustrates a welding tool for welding a stud to a workpiece and which employs improved control circuitry in accordance with the present invention. The welding tool 10 includes a main housing 12 of dielectric material having a front wall 14 and a rear cap 16. A chuck 18 is located at the forward end of the tool and has a slotted recess 20 to receive a metal stud 22. The stud 22 is sometimes referred to in the art as a fastener and both terms will be used interchangeably herein.

Figure 2:
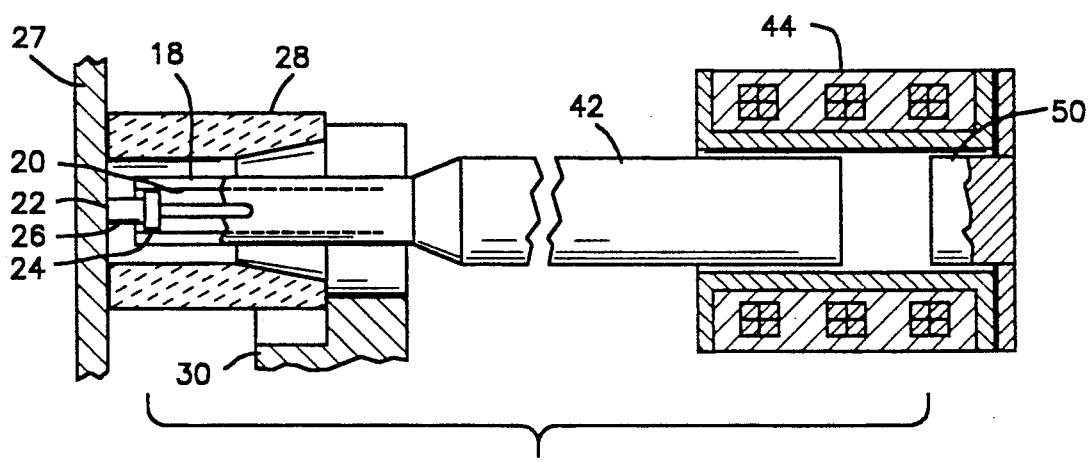
FIG. 2 is an enlarged schematic view of a fastener and components of the welding tool of FIG. 1 when in a position proximate to a workpiece.

As shown more specifically in FIG. 2, each stud 22 has an enlarged head 24 and a stem or shank 26. The head 24 of a stud is engaged by the chuck 18 and the shank protrudes from the chuck toward a workpiece 27.

A spark shield 28 coaxially surrounds the chuck 18 and is positioned so that the end of the stud 22 normally protrudes slightly beyond the spark shield before the end of the stud is pressed against the surface of a workpiece 27, whereupon the stud is retracted from an initial extended position to the retracted position as shown in FIG. 2. The spark shield 28 is supported in position by a foot 30 which, in turn, is supported at the front of the tool by an adjustable leg 32 mounted in the tool housing.

The stud chuck 18 is attached to a chuck leg 34 (FIG. 1) which is electrically connected by a cable clamp 36 to a main welding cable 38. A rear clamp 40 is attached to the clamp 36 and, in turn, is connected to a movable solenoid core 42 so that the core 42 moves longitudinally of the tool along with the clamp parts 36 and 40, the leg 34, the chuck 18, and the stud 22. The core 42 extends into a lifting and holding coil 44 and is pulled or retracted into the coil when sufficient power is supplied through leads 46 and 48. An adjustable stop 50 at the rear of the coil 44 determines the extent to which the core moves into the coil and, hence, determines the extent to which the stud is retracted from the workpiece during the welding cycle. A return or plunge spring 52 returns the stud to the workpiece after current to the coil 44 has been shut off.

Prior to commencing a welding operation, the welding tool 10 carries a stud 22 such that it extends slightly beyond the forward end of the spark shield 28. When an operator positions the tool against a workpiece 27, the stud is retracted somewhat so that its forward end is flush with the forward end of the spark shield 28. This causes the core 42 to be retracted somewhat against the bias of spring 52 in a direction toward the stop 50. After the operator has actuated a trigger, such as trigger 54, current is supplied to the solenoid coil 44, sometimes referred to as the lift coil, which then further retracts the core into the coil in the direction toward the stop 50. The extent of this last retraction from the workpiece to the fully retracted position defines the arc length between the workpiece and the forward end of the stud. The arc length may vary from one welding operation to the next due to workpiece or stud length variations. Workpiece variations may result from either concave or convex surface changes causing the stud to have a workpiece engaging position which is forward of or rearward of that illustrated in the example of FIG. 2 and thereby varying the arc length. Similarly, variations in the length of the stud from that illustrated in FIG. 2 will result in variations in the arc length.

Variations in arc length due to workpiece or stud length variations, as discussed above, result in variations in the amount of lift or displacement of core 42 toward the stop 50 once the coil 44 is energized. This lift may vary, for example, over a range of 0.20 inches to 0.80 inches dependent upon variations in the workpiece and in the length of the stud. Thus, a long stud or a slight rise on the surface of the workpiece may result in a short lift on the order of 0.020 inches. On the other hand, a somewhat shorter than normal stud or a depression in the surface of the workpiece may result in a somewhat greater lift, such as on the order of 0.080 inches. The amount of this lift is directly related to the arc length.

Figure 3:
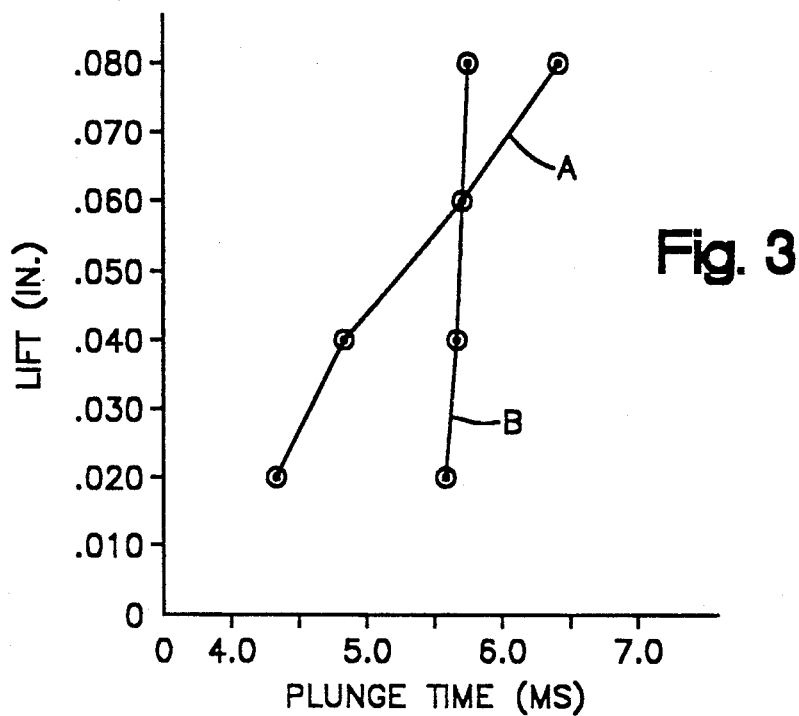
FIG. 3 is a graphical illustration of lift in inches with respect to plunge time in milliseconds.

Reference is now made to FIG. 3 which provides a graphical illustration of stud lift or stud displacement with respect to time. Curve A represents lift with respect to plunge time in the absence of the improved circuitry herein. As used in FIG. 3, the plunge time refers to the point in time in the welding cycle at which the plunge is completed, i.e., the point in time at which the stud strikes the workpiece. Curve A shows that for a variation in lift from one weld to the next from 0.020 inches to 0.080 inches, the variation in time for the stud to strike the workpiece is 2.2 milliseconds. Stated otherwise, if from weld to weld, the lift varies by 0.060 inches, then the time for the stud to strike the workpiece will vary by 2.2 milliseconds. This results in a substantial difference in the amount of current flowing at the time the stud contacts the workpiece. Therefore, there will be an inconsistency in the weld quality from weld to weld.

Utilizing the present invention presents a lift versus plunge time in accordance with curve B over a lift variation of 0.020 inches to 0.080 inches. The measured plunge time variation for the stud to strike the workpiece is on the order of 0.12 milliseconds. Thus, the present invention provides consistency in weld quality from weld to weld. For example, the magnitude of the weld current may be relatively constant when the stud strikes the workpiece from weld to weld even though the lift may vary by as much as 0.060 inches, as is illustrated in curve B.

Figure 4:
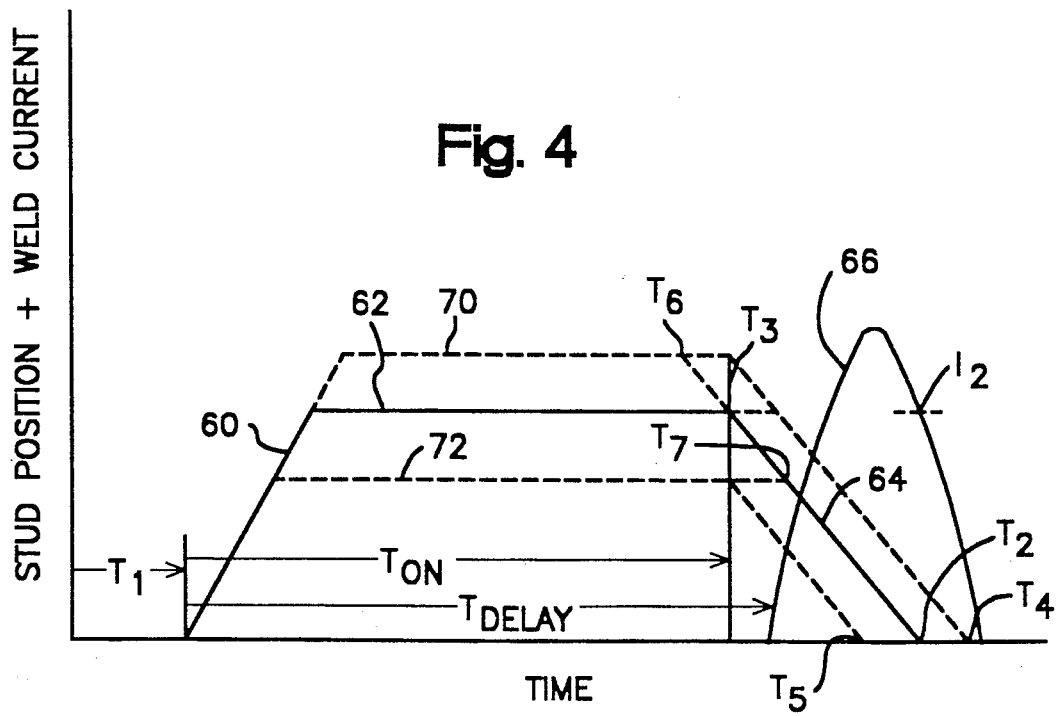
FIG. 4 is a graphical illustration showing stud position and weld current with respect to time and which is useful in describing the manner of operation of the invention.

Reference is now made to FIG. 4 which illustrates a welding cycle of stud position and weld current with respect to time. With reference to FIG. 4, it will be noted that after an initial time period $T_1$, to be described hereinafter, the stud is retracted from the workpiece as indicated by the upstroke curve portion 60 to a fully retracted position as indicated by the flat curve portion 62. At a later time, the stud is plunged back to the workpiece as indicated by the plunge stroke curve portion 64. In FIG. 4, the plunge stroke curve portion 64 terminates at a point in time during which the welding current, as indicated by curve 66, is on. This takes place at a point in time $T_2$ at which the intensity of the current flow is at a level $I_2$. The plunge stroke commenced at time $T_3$. A variation in the workpiece or in stud length, as discussed hereinbefore, results in a variation of the lift. Thus, the fully retracted stud position may vary from that of curve portion 62 in FIG. 4 to, for example, curve portion 70 or 72. The curve portion 70 is indicative of either a short stud or that the stud is positioned over a depression in the workpiece. If the plunge stroke commences at time $T_3$, the stud will strike the workpiece at time $T_4$, after time $T_2$. This indicates that the weld current will be substantially less at the point of contact and, hence, the weld quality will differ from weld to weld.

Curve portion 72 is indicative of either a longer stud or that the stud is positioned over raised surface portion of the workpiece. If the plunge stroke commences at the same point in time $T_3$ as that for the prior example, then the stud will strike the workpiece at time $T_5$, which takes place at a point in time earlier than that of time $T_2$. This is at a different level of weld current from that of the previous examples. This inconsistency in the weld quality results from varying arc lengths resulting from variations in the length of the welding stud and variations of the workpiece.

In accordance with the present invention, the point in time that the stud strikes the workpiece is controllable as a function of variations in stud displacement as measured prior to commencing a welding cycle. Thus, with reference to FIG. 4, the present invention contemplates an initial sensing period $T_1$, prior to a welding cycle, during which the stud displacement is measured. This is followed by a period $T_{on}$ during which the solenoid coil 44 is energized to withdraw the stud to its fully retracted position. At the end of the time period $T_{on}$, the solenoid coil 44 is deenergized and the return spring 52 causes the stud to plunge toward and then make contact with the workpiece. The time period $T_{on}$ is varied in accordance with the stud position measurement made during time period $T_1$ in order to control the point in time that the stud strikes the workpiece. For example, if it is desired that the weld current be at a level $I_2$ at the point in time that the stud strikes the workpiece, the time period $T_{on}$ will be varied so that the plunge stroke always terminates at time $T_2$. This indicates that, for the illustration in FIG. 4, the time $T_{on}$ be terminated at time $T_6$ for the short stud position indicated by waveform portion 70 or at time $T_7$ for a longer stud, as indicated by curve portion 72. In other situations, it may be desirable to have a different level of welding current for shorter studs than that for longer studs at the point in time that the stud strikes the workpiece and this may be adjusted by varying the duration of $T_{on}$ in accordance therewith.

Figure 5:
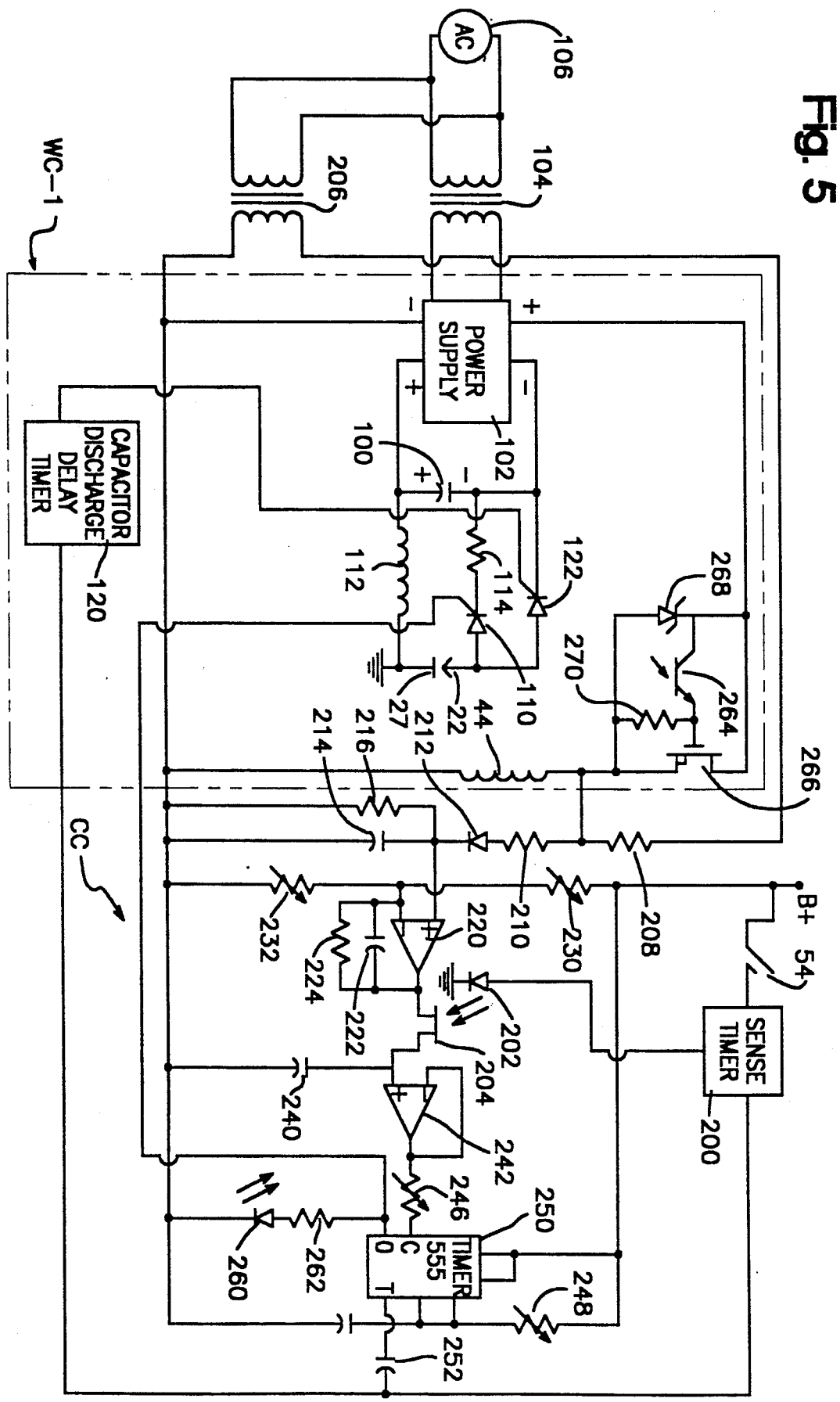
FIG. 5 is a schematic-block diagram illustration of a control circuit, in accordance with the present invention, for use with one version of a welding circuit for a welding tool.

The invention may be practiced with a control circuit used in conjunction with a welding circuit known in the art. Such welding circuits include a single phase transformer rectifier system and a drawn arc capacitor discharge system. Other systems may include inverters and choppers for providing welding current. FIG. 5 illustrates a control circuit CC constructed in accordance with the invention and which is employed in conjunction with a drawn arc capacitor discharge welding control system WC-1 to be described hereinbelow.

Figure 6:
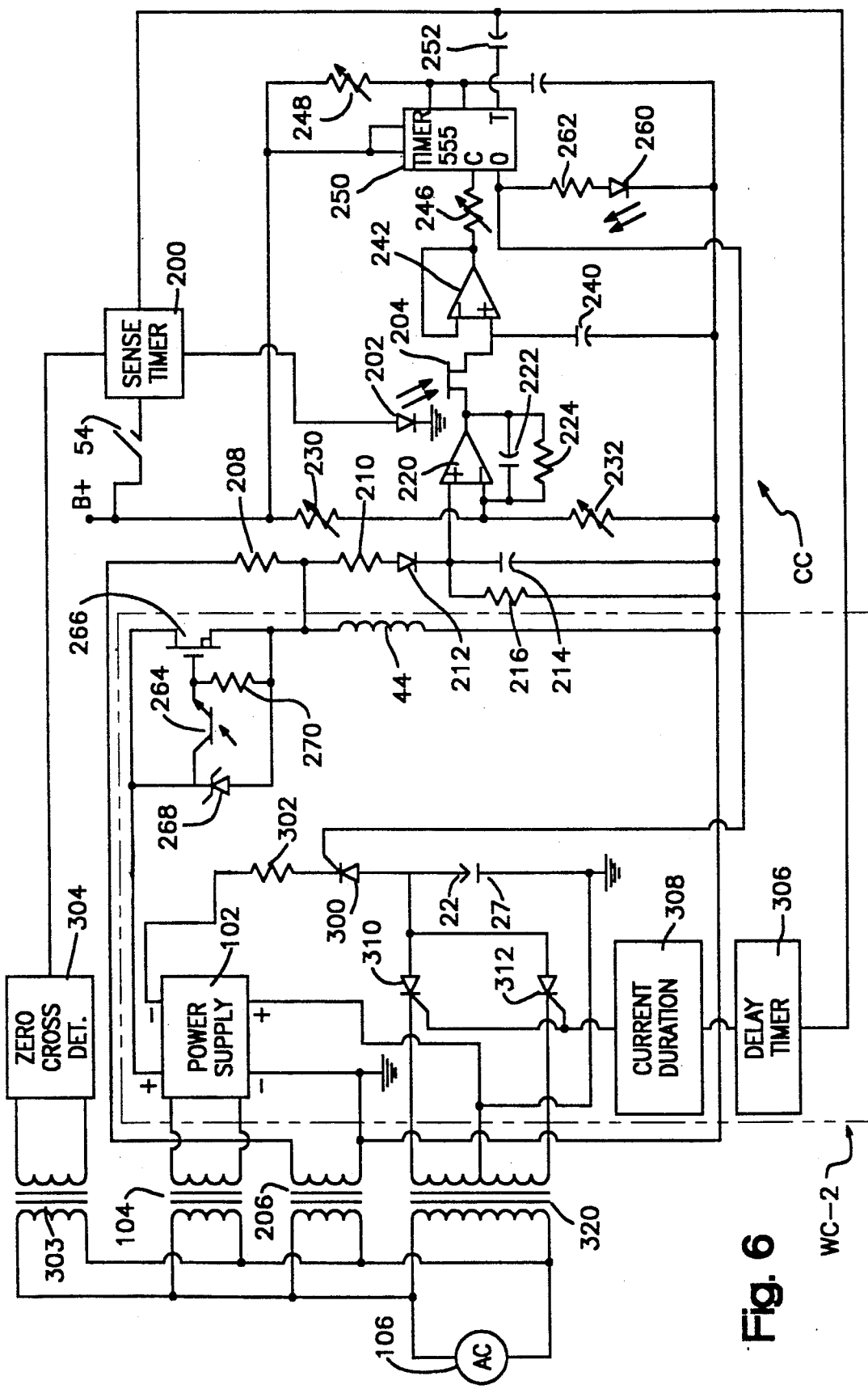
FIG. 6 is a schematic-block diagram illustration similar to that of FIG. 3 but showing the control circuit with another version of a welding circuit for a welding tool.

The control circuit CC, in accordance with the invention, will also be described herein in conjunction with a conventional single phase transformer rectifier welding control system WC-2, illustrated in FIG. 6.

Reference is now made to FIG. 5 and specifically to the welding control circuit WC-1 which includes a discharge capacitor 100 which is charged by a conventional DC power supply source 102 coupled by means of a suitable transformer 104 to an AC voltage supply source 106. After an initial measuring period $T_1$, to be described in greater detail hereinafter, the capacitor 100 is permitted to discharge by turning on a silicon controlled rectifier (SCR) 110 for a variable time duration $T_{on}$. This permits a low level welding current to flow, as current is discharged from the capacitor through a wave shaping coil 112, the workpiece 27, the stud 22, and thence through the SCR 110 and a current limiting resistor 114.

When a decision is made to fully discharge the capacitor 100, a capacitor discharge delay timer 120, to be described in greater detail hereinafter, turns on a second silicon controlled rectifier (SCR) 122. The main welding current is now supplied as the capacitor discharges through a lower impedance path by way of SCR 122.

Attention is now directed to the control circuit CC for controlling the welding operation for controlling the plunging of the stud. An operator employing a welding tool, such as that shown in FIG. 1, will position a welding stud 22 against the workpiece 27 so that the welding stud retracts from its initial extended position to that as shown in FIG. 2. Then, the operator activates the trigger 54 which activates the control circuit CC (FIG. 5). This causes a sense timer 200 to provide a sensing time period $T_1$ (see FIG. 4) during which the position of the stud 22 is determined. That is, the displacement of the stud from its initial extended position to that in which the stud is withdrawn somewhat but in contact with the workpiece is measured before the stud is retracted to its fully retracted position. During this sensing period, the displacement of the stud is measured by measuring the inductance of the coil 44. That is, as the core 42 moves further into the coil 44, the air gap between the core and the stop 50 will decrease. This decrease in the air gap will increase the inductance of the coil 44. Thus, the inductance of the coil will increase as the core moves further into the coil and will decrease as the core moves out of the core.

The variations in inductance are, in general, proportional to movement of the core. Movement of the core is, in turn, dependent upon variations in the metal workpiece 27 and in the length of the stud 22. That is, if the stud is positioned against a depression in the workpiece 27 or if the stud is short, the air gap between the core 42 and the stop 50 will increase and the inductance will decrease. Conversely, for longer studs or for a stud located on a raised surface portion of the workpiece 27, the air gap will decrease and the inductance of the coil will increase. These variations in the length of the air gap between the core 42 and the stop 50 are related to the variations in the arc length between the stud and the workpiece during the main welding operation and are also related to the variations in the lift. Thus, a longer stud or a stud that is positioned against depression in the surface of workpiece 27 will result in a shorter lift than that for a stud of a normal length or a stud which bears against a flat surface of a workpiece.

In accordance with the present invention, these variations in the workpiece or stud length are measured during the sensing period $T_1$ by measuring the inductance of coil 44 and using the variations in the inductance to provide a measure of stud displacement which is then used to control the point in time at which the stud makes contact with the workpiece during the welding operation. This is achieved by varying the time during which the lift solenoid 44 is energized as will be discussed hereinafter.

During the sensing period $T_1$, the sense timer 200 energizes a light emitting diode 202 which is optically coupled to an optically actuated field effect transistor 204 to sample the value of the inductance of lift coil 44. During this period, a small AC current, which is not sufficient to energize the lift coil, flows from a secondary winding on a transformer 206 through a current limiting resistor 208 and, thence, through the coil 44. The magnitude of the AC voltage on the secondary of transformer 206 may, for example, be on the order of 24 volts. The resistor 208 and the lift coil 44 act as a voltage divider. The voltage across the lift coil 44 is supplied by way of a resistor 210 and a rectifying diode 212 to charge a sampling capacitor 214 which is connected in parallel with a limiting resistor 216. The voltage across the capacitor 214 represents the inductance of the lift coil 44 and this voltage is amplified by an amplifier 220 having an RC filter including capacitor 222 in parallel with a resistor 224 connected, as shown, for smoothing out the ripple edge on the capacitor voltage. Offset and gain adjustment for the amplifier 220 may be obtained with a variable offset resistor 230 connected between the negative input of the amplifier and B+ voltage supply source and a variable gain resistor 232 connected between the negative input of the amplifier and a negative terminal on the power supply 102.

The output voltage of amplifier 220 is a ripple reduced voltage having a magnitude representative of the inductance of the lift coil 44. During the sensing period $T_1$, the sense timer 200 energizes the light emitting diode 202 for a period on the order of 50 milliseconds. It is during this period that the voltage from the amplifier 220 is sampled through the field effect transistor 204 and stored in a sample and hold capacitor 240. This voltage is then supplied by way of buffer amplifier 242 and a variable resistor 246 to the C input of a conventional timer, generically known as a 555 timer, which serves to provide an output signal at its output terminal 0. The time duration of this output signal is dependent upon the magnitude of the input voltage applied to its C input and by the setting of a variable adjustment resistor 248. Consequently, the timer 250 acts as a variable duration one-shot circuit with the duration of the output pulse varying with the magnitude of the measured inductance of coil 44 as represented by the magnitude of the voltage supplied to the C input of the timer. The timer 250 is actuated by a trigger pulse supplied to its trigger input T by way of a capacitor 252. This trigger pulse is supplied by the sense timer 200 upon completion of the initial sensing period $T_1$. Once triggered, the one-shot timer 250 provides an output pulse at its output terminal 0 to energize a light emitting diode 260 by way of a resistor 262. This light emitting diode 260 is optically coupled to a transistor 264 to supply a turn on signal to a field effect transistor 266. The turn on signal is stabilized by way of a zener diode 268 to provide a forward biasing voltage across resistor 270. The field effect transistor 266 is thus switched into conduction for a time period $T_{on}$ as indicated by the waveform of FIG. 4. During this period, the lift coil 44 receives current from the power supply 102 of a sufficient magnitude to energize the coil to thereby lift the core 42 to its fully retracted position until the lift coil is de-energized upon completion of the time period $T_{on}$. Upon termination of the time period $T_{on}$, the coil 44 is de-energized and the core 42 is driven by spring 52 in the direction of the workpiece causing the stud 22 to move therewith and then strike the workpiece 27.

In accordance with the present invention, the weld quality is maintained consistent from weld to weld by measuring the stud position prior to commencing a welding cycle and then adjusting the on time of the lift coil 44 (the $T_{on}$ time) to compensate for any variations in the workpiece or variations in the stud length. Thus, as discussed hereinbefore with reference to FIG. 4, the lift coil on time for a stud position in accordance with waveform portion 62 may terminate at time $T_3$ to commence the plunge stroke so that the stud strikes the workpiece at a point in time $T_2$. If the stud posittion changes from one weld to another weld to a position corresponding with waveform portion 70, then in order to obtain control so that the stud strikes the workpiece at the same point in time $T_2$, the lift on time is shortened to a point in time designated as $T_6$. Similarly, if the stud position changed to that as indicated by waveform portion 72, it may be desirable to increase the lift on time so that the plunge stroke commences at time $T_7$ so that the stud strikes the workpiece at time $T_2$. These variations in lift on time, $T_{on}$, are obtained by timer 250 as it responds to variations in the magnitude of the control voltage supplied to the input terminal C from the storage capacitor 240. The variations in the magnitude of this control voltage track the variations in the inductance of the lift coil.

The capacitor discharge delay timer 120 delays the actuation of the silicon controlled rectifier 122 from time $T_1$ until the completion of a delay time $T_{delay}$. The main discharge of capacitor 100 will correspond with waveform 66 in FIG. 4. The point in time $T_2$ is a known point in time relative to the commencment of the main discarge of the capacitor. Also, since the $T_{delay}$ time is a fixed time period as is the sensed time $T_1$, the point in time $T_2$ is a known point in time relative to the actuation of switch 54.

Reference is now make to FIG. 6 which illustrates the application of the control circuit CC in conjunction with a welding control circuit WC-2 taking the form of a single phase transformer rectifier system as opposed to the capacitor discharged system described hereinbefore with reference to FIG. 5. Like components in FIGS. 5 and 6 are identified with like character references and only those components which differ will be described in detail hereinafter.

From an examination of FIG. 6, it is seen that after the sense time period $T_1$ (FIG. 4) a silicon controlled rectifier 300 is gated into conduction. This permits current to flow from the power supply 102, through the workpiece 27 and stud 22, the SCR 300 and a resistor 302 while the stud and workpiece are in contact. This establishes a pilot arc as the stud is being retracted. After the sense timer 200 has timed out the measuring or sensing time period $T_1$, it will then on the next zero crossing of the AC line voltage produce a trigger pulse for actuating a delay timer 306 as well as the one-shot timer 250. The delay timer 306 will now delay the start of supplying main arc welding current by a given number of half cycles of the AC line voltage. Upon completion of counting a given number of half cycles of the AC line voltages, the delay timer provides a trigger pulse for activating a current duration timer 308 which then provides an output signal to turn on the silicon controlled rectifiers 310 and 312 for a given number of half cycles of the AC line voltage during which the main welding current is supplied. During this period that the SCRs 310 and 312 are conducting, a pulsating current will flow from the center tap secondary winding on transformer 320 through the workpiece 27, the stud 22 and then through the silicon control rectifiers.

The operation of the control circuit CC in conjunction with the welding control circuit WC-2 is essentially the same as that discussed hereinabove with respect to the welding control circuit WC-1. Thus, with reference to FIG. 4, the sense timer 200 provides an initial sensing time period $T_1$ during which the control circuit measures the stud position by noting the inductance of lift coil 44 in the manner described hereinbefore. One difference in this embodiment, however, is that the sense timer terminates the period $T_1$ in synchronism with the detection of a zero crossing of the AC voltage by virtue of the zero crossing detector 304 so as to initiate the $T_{on}$ period as well as the $T_{delay}$ period in synchronism with the AC line voltage. The $T_{on}$ period, which determines the time during which the lift coil 44 is fully energized to retract the core 42, will be varied in accordance with the measured inductance of the coil 44. Once that time period has expired, the lift coil 44 is de-energized and the core and stud plunge toward and then engage the workpiece by the forces imposed by the return spring 52. The waveform 66 of FIG. 4 in this case represents the last half cycle of the welding current, with the delay period $T_{delay}$ being a multiple of half cycles as it is synchronized with the zero crossings of the AC line voltage. The point in time that the stud strikes the workpiece during this weld current half cycle is controlled by the control circuit so as to take place at a point in time which is a function of the measured displacement. This point in time can be controlled from weld cycle to weld cycle to achieve uniformity of weld quality from weld to weld.

Although the invention has been described with in conjunction with preferred embodiments, it is to be appreciated that various modifications may be made without departing from the spirit and scope of the invention as defined by the appended claims.

Having described the invention, the following is claimed:

1. Apparatus for welding a stud to a workpiece comprising:

means for positioning said stud against said workpiece so that said stud retracts from an extended first position to a second position against said workpiece;

means for retracting said stud away from workpiece to a fully retracted third position;

means for providing welding current to establish a welding arc between said stud and said workpiece as said stud is being retracted to said third position;

means for plunging said stud toward said workpiece to make contact therewith;

means for measuring the displacement of said stud from said first position to said second position with said measuring taking place while said stud is in engagement with said workpiece and before said stud is retracted therefrom to said third position; and means for controlling the plunging of said stud toward said workpiece as a function of said measured displacement to control the point in time at which said stud makes contact with said workpiece.

2. Apparatus as set forth in claim 1 wherein said means for positioning said stud includes stud holding means and wherein said plunging means include means for resiliently biasing said stud holding means toward said extended first position.

3. Apparatus as set forth in claim 2 wherein said stud holding means includes a stud chuck for holding said stud and wherein said resilient biasing means includes a return spring coupled to said chuck for resiliently biasing said chuck and said stud toward said first position.

4. Apparatus as set forth in claim 2 wherein said means for retracting includes a solenoid having a lift coil and a core movable within said lift coil, said core being connected to said stud holding means for movement therewith from said stud extended first position to said fully retracted position and means for energizing said lifting coil to cause said core to move to a position corresponding with said stud fully retracted position.

5. Apparatus as set forth in claim 4 wherein said means for measuring the displacement of said stud includes means for applying test current to flow through said lift coil prior to retracting said stud to thereby develop a measure signal having a value dependent upon the inductance of said coil which, in turn, varies in accordance with the position of said core and, hence, of said stud.

6. Apparatus as set forth in claim 5 wherein said means for controlling the plunging of said stud includes means responsive to said measure signal for varying the time duration of energizing said lift coil as a function of the magnitude of said measure signal.

7. Apparatus as set forth in claim 6 including timing means for timing an initial measuring time interval prior to retracting said stud to its fully retracted position.

8. Apparatus as set forth in claim 7 including signal sttorage means operative during said initial measuring time interval for storing a signal having a value corresponding with that of said measure signal.

9. Apparatus as set forth in claim 8 wherein said means for varying the time duration of energizing said lift coil includes timing means responsive to said stored signal for providing a control signal having a time duration corresponding with that of the magnitude of said stored signal and, hence, of said measure signal.

10. Apparatus as set forth in claim 9 wherein said means for energizing said coil includes actuatable switch means for, when acttuated, connecting said coil across an energy source of sufficient magnitude to energize said coil to move said core to a position corresponding with said stud fully retracted position.

11. Apparatus as set forth in claim 10 including means responsive to said control signal for actuating said switch means for a time duration dependent upon the time duration of said control signal.

12. Apparatus as set forth in claim 11 including light emitting means for transmitting an optical signal for a time duration corresponding with that of said control signal.

13. Apparatus as set forth in claim 12 wherein said switch means includes means responsive to said optical signal for actuating said switch means for a time duration in accordance with that of said control signal.

14. Apparatus for welding a stud to a workpiece during each of a plurality of weld cycles and comprising:

means for positioning said stud against said workpiece so that said stud retracts from an extended first position to a second position against said workpiece;

means for retracting said stud away from said workpiece to a fully retracted third position;

means for providing welding current that varies in magnitude with respect to time during each weld cycle to establish a welding arc between said stud and said worpiece as said stud is being retracted to said third position;

means for plunging said stud toward said workpiece to make contact therewith;

means for measuring the displacement of said stud from said first position to said second position with said measuring taking place while said stud is in engagement with said workpiece and before said stud is retracted therefrom to said third position; and means for controlling the relative timing of the means for plunging and said welding current providing means as a function of said measured displacement during each weld cycle so that the magnitude of said welding current at the point in time at which said stud makes contact with said workpiece is relatively constant from one weld cycle to the next.

15. Apparatus as set forth in claim 14, wherein said means for controlling the relative timing includes means for controlling the plunging of said stud toward said workpiece as a function of said measured displacement.

* * * * *